METHOD OF MAKING SHAPED FIBER REINFORCED RUBBER DIAPHRAGMS

Filed Oct. 23, 1959

STEP A — PREPARE AN AQUEOUS SLURRY OF THOROUGHLY DISPERSED MIXTURE OF STAPLE FIBERS AND WATERLEAF FORMING FIBRIDS OF A CURABLE SYNTHETIC RUBBER COMPOSITION.

STEP B — FILTER THE SLURRY ON A POROUS FABRIC COVERED SHAPED FILTER SCREEN HAVING A DEPTH AT LEAST ONE HALF ITS WIDTH TO FORM A SHAPED WATERLEAF ON SAID FABRIC, SO THAT THE FABRIC IS AN INTEGRAL PART OF A FINISHED PRODUCT.

STEP C — DRY THE SHAPED WATERLEAF.

STEP D — HEAT AND PRESS THE SHAPED WATERLEAF IN A MOLD SHAPED SIMILAR TO SAID FILTER SCREEN TO CURE SAID FIBRIDS INTO A CONTINUOUS CURED SYNTHETIC RUBBER MATRIX FOR SAID FIBERS.

STEP E — REMOVE SAID PRODUCT FROM SAID MOLD.

INVENTOR
HENRY E. QUEHL, JR.

BY

AGENT

United States Patent Office 3,080,271
Patented Mar. 5, 1963

3,080,271
METHOD OF MAKING SHAPED FIBER
REINFORCED RUBBER DIAPHRAGMS
Henry E. Quehl, Jr., Norwalk, Conn., assignor to E. I. du Pont de Nemours and Company, Wilmington, Del., a corporation of Delaware
Filed Oct. 23, 1959, Ser. No. 848,189
1 Claim. (Cl. 162—108)

This invention relates to a new method of making fiber reinforced rubber articles of predetermined size and shape, especially hollow and relatively deep shaped articles, and to improved products made by this method.

When hollow and relatively deep shaped rubber articles, such as so-called "deep-drawn" diaphragms, are made from rubber materials which contain no reinforcing fiber or fabric, their usefulness is generally limited to those applications where toughness and dimensional stability are not of great importance. Attempts to make such an article having appreciable depth in relation to its width or diameter by deep draw molding of rubber-coated fabric sheet material have failed, mainly because the fabric is damaged before the desired depth of shape is obtained. The fabric is also forced to the surface of the product. Moreover, attempts to make these articles from sheets of rubber containing mill blended reinforcing fibers have also failed, due largely to the fact that the fibers in the product tend to be in a clustered state of dispersion and unidirectional in position. The resistance of the product to tensile and tearing stresses is therefore non-uniform and clumps of fiber occur in the surface. This non-uniformity is particularly objectionable in a very thin wall product.

A principal object of this invention is to provide a new and improved method of making hollow and relatively deep shaped fiber reinforced rubber articles.

A more specific object is to provide a method of making a relatively thin wall fiber reinforced rubber article of predetermined size and shape having a depth of from one-half to many times the diameter or width and in which the reinforcing fibers are in a thorough and multi-directional state of dispersion.

A further object is to provide a hollow and relatively deep shaped fiber reinforced rubber article of improved dimensional stability and resistance to tensile and tearing stresses.

Other important objects of the invention will be apparent from the description which follows.

The drawing is a flow sheet of the process of this invention.

The term "waterleaf" is used in its normal sense to designate a paper-like structure of intimately entangled fibrous particles obtained by depositing the particles from a slurry onto a porous membrane such as a screen or felt.

Throughout the specification and claims, the term "rubber" is used generically to denote any type of rubber.

The waterleaf forming rubber particles referred to in step (a) above should have at least one dimension of minor magnitude relative to their largest dimension. They are generally retained to the extent of not over 10% on a 10 mesh screen and at least 90% on a 200 mesh screen when classified by the Clark Classification Test (Tappi 33, 294–8, No. 6, June 1950).

The preferred synthetic rubber particles involved in step (a) above are fibrids. "Fibrids" are wholly synthetic polymeric particles capable of forming paper-like structures on a paper-making machine. Fibrids are characterized by (1) an ability to form a waterleaf having a couched wet tenacity of at least 0.002 gram per denier when deposited from a liquid suspension upon a screen and having a dry tenacity of at least this much when dried at a temperature below 50° C.; (2) an ability when deposited concomitantly with staple fibers from a liquid suspension upon a screen to bond at least their own weight of the fibers by physical entwinement therewith to give a composite waterleaf having a wet tenacity of at least 0.002 gram per denier; (3) a Canadian freeness number between 90 and 790; and (4) retention of at least 2.0 grams of water per gram of particles under a compression load of about 39 grams per square centimeter.

Fibrids, their characteristics, prepartion and uses, are disclosed in U.S. application S.N. 788,370, filed January 22, 1958, by E. Campbell et al., now U.S. Patent 2,988,782; and Belgian Patent 564,206 granted July 23, 1958.

Synthetic rubber fibrids are made by introducing a solution of a synthetic rubber solution into a precipitant comprising a liquid non-solvent for the rubber under conditions of shear precipitation. The precipitant is preferably cooled below the temperature at which the uncured rubber becomes tacky, and should contain a finely divided solid material adapted to prevent agglomeration of the rubber particles being formed therein. Suitable anti-agglomeration agents include furnace combustion carbon black, zinc stearate, and finely divided asbestos. These agents are usually added in the amount of about 0.1 to 5% by weight of precipitant.

The dissolved rubber entering the precipitant is subjected to a high degree of shear. During this shear-precipitation formation of the rubber particles, the precipitation number, or "$P'_A$" value as described in application S.N. 788,370, now U.S. Patent 2,988,782, of the system is preferably maintained between 100 and 80,000.

Either the precipitant or the rubber solution, or both, as well as the waterleaf-forming slurry, can contain additives for modifying the types of slurries and/or the nature of the sheet products obtained. For example, pigments, viscosity controlling agents, lubricants, or surface-active agents can be present.

The preferred amount and type of staple fibers to use in the waterleaf-forming slurry will depend on many factors, including the type of article to be produced and conditions of forming and filtering the slurry. Those skilled in the art to which this invention relates will be able readily to select a size, type and proportion of fiber to meet the requirements of any particular application.

Any one or more of a wide variety of synthetic or natural staple fibers can be used, such as nylon, rayon, cotton, polyacrylonitrile, and polyethylene terephthalate. A particularly useful type of polyester fiber when maximum product flexibility is desired is spontaneously elongatable polyethylene terephthalate fibers as described in Belgian Patent No. 566,145.

The fibers can be of any size which, in the amount used, will lend the necessary toughness to the product and will disperse with the rubber particles into a waterleaf-forming slurry. Fibers about ¼ to ½ inch long usually offer a practical balance between ease of dispersion and product toughness. Fibers more than about one inch in length are normally difficult to disperse in water. However, fibers having a length of about 1 to 2 inches along with the waterleaf-forming rubber particles can be dispersed by the foam technique disclosed in U.S. Application S.N. 726,186, filed April 3, 1958 by F. Wilcox now U.S. Patent 3,007,840.

The weight ratio of waterleaf-forming rubber particles to fibers present in the slurry from which the shaped waterleaf is formed is a factor of considerable importance in governing the toughness, flexibility and surface finish of the final product. When making a single layered structure, the best rubber particle:fiber ratio is preferably about 3:1, ratios up to about 20:1 are useful, especially where flexibility and surface finish are of greater importance than maximum toughness. Rubber particle: fiber ratios of about 1:3 on the other hand are also useful when there is special emphases on toughness.

When making a shaped waterleaf from a plurality of layers in accordance with this invention, the rubber particle:fiber ratio can vary over an even wider range for each layer. In fact, it will sometimes be desirable to use a surface layer of up to 100% rubber particles, or an intermediate layer of up to about 95% fibers, the former to give the product a smooth, flexible fiber-free surface and the latter to render the product highly resistant to tensile and tearing stresses. The ratio of rubber particles to fibers throughout the layered structure can vary from 95:5 to 25:75.

The slurry of rubber particles and fibers is filtered by means of a shaped filter membrane constructed of screen or other porous material adapted to retain the dispersed solids in the form of a waterleaf having the approximate size and shape of the desired final product. Known filtering techniques, such as the use of vacuum or centrifugal force, can be employed to aid in forming the waterleaf and in removing the water therefrom. The waterleaf can be formed on either the inside or the outside of the hollow and relatively deep shaped filter membrane. Drying of the shaped waterleaf can be done either before or after it is removed from the filter membrane.

The dried shaped waterleaf is a preform from which an improved hollow and relatively deep fiber reinforced rubber article readily can be molded. During the final molding step, the waterleaf is pressed and cured to its final structure and dimensions in any suitable mold, the molding surfaces of which are of approximately the same shape as the porous filter on which the shaped waterleaf is formed. The mold is preferably a matched metal mold of the type commonly used for molding hollow and deep shaped rubber articles. Sufficient heat and pressure are used to give a consolidated structure in which the rubber particles are welded together into a substantially continuous phase. The reinforcing fibers embedded within the mass of cured rubber are in a thorough and multidirectional state of dispersion. That is, the fibers are substantially non-clustered and randomly oriented with respect to each other. This disposition of fibers is an important factor in attaining the objects of this invention.

The product of this invention can be either porous or non-porous, depending on such items as the fiber content of the waterleaf, additives present in the waterleaf, and the temperature/pressure conditions of consolidating and curing. For example, high fiber contact, solvent extractable or gas-liberating additives, and/or relatively low molding temperatures and pressures can be employed to produce porous articles.

Products are obtainable by the novel method of this invention which have heretofore been impossible, impractical or uneconomical to make. The method has particular utility in the production of hollow and deep shaped rubber articles of improved toughness and dimensional stability which articles have relatively thin walls. Such articles, in the form of sealing sleeves, diaphragms, glooves, boots and the like, are light in weight and surprisingly tough for their thickness. The high degree of toughness per unit of thickness is a decided advantage in applications for such articles where minimum weight and/or thickness of the rubber articles are important.

The following examples are given to illustrate the invention and not to limit its scope in any way. All quantities are stated on a weight basis unless otherwise indicated.

*Example 1*

This example illustrates the production of a nylon fiber reinforced buna-N rubber article which is shaped like a truncated cone with a rim on the larger end such as a small stove-pipe hat. The product is for use as a diaphragm type of sealing sleeve on an air-hydraulic spring.

First, a quantity of buna-N rubber fibrids is prepared from a 10% solution in tetrahydrofurane of the following compounded and milled composition:

| | Parts by weight |
|---|---|
| Buna-N (copolymer of butadiene and acrylonitrile) | 100 |
| Calcium carbonate filler ("Atomite") | 20 |
| Stearic acid | 1 |
| Zinc oxide | 5 |
| Phenyl-beta-naphthylamine ("Neozone" D) | 1 |
| Dibutyl Cellosolve sebacate | 40 |
| Sulfur | 1.5 |
| Carbon black ("Pelletex" C) | 20 |
| | 188.5 |

To 200 parts of the 10% solution is added 0.16 part of di-2-benzothiazyl disulfide ("MBTS" accelerator). This solution is then poured slowly as a fine stream into a vigorously agitated precipitant which consists of 1500 parts of water at about 40° F. and 3.2 parts of furnace carbon black ("Philblack" A). The resulting buna-N rubber fibrids are deposited on a screen, washed with water and drained.

A fibrid slurry is prepared by dispersing one part of the washed and still wet buna-N fibrids in 10 parts of water.

Separately, a fiber slurry is prepared by thoroughly dispersing 0.25 part of nylon staple fiber in 100 parts of water containing 0.05 part of "Triton" X–100 octyl phenyl polyglycol ether, a nonionic wetting agent. The nylon fibers are about ¼ inch in length and have a fineness of 3.0 denier per filament.

The buna-N fibrid slurry and the nylon fiber slurry are uniformly blended together in such amounts that the weight ratio of fibrids to fibers in the blended slurry is 75 to 25.

A filtering apparatus is provided which is adapted to form a shaped fibrid/fiber waterleaf or preform from the blended slurry. The apparatus is a modified paper makers' sheet mold in which the screen is replaced with a piece of sheet metal having a 3-inch diameter opening in the center. Over this opening is fastened a stovepipe-hat-shaped filter membrane made of 100 mesh screen. Specifically the filter membrane is in the form of a 4 inch high truncated cone, with a rim at the bottom, the screened top of which has a diameter of one inch, the open bottom a diameter of 1.5 inches, and the screen rim defining the bottom an outside diameter of 3¼ inches. Inside the filter membrane is a framework of stiff reinforcing wires; above it is a slurry reservoir; below it is a suction box.

The uniformly blended fibrid/fiber slurry is transferred to the reservoir of the filtering apparatus and quickly filtered with the aid of vacuum beneath the filter membrane. Sufficient slurry is used to deposit a fibrid/fiber layer about ⅛ inch thick on the filter membrane. After most of the water is vacuum-drawn from the shaped fibrid/fiber waterleaf, the membrane-supported waterleaf is dried in a heat zone at about 90 to 100° C. The dried waterleaf, now a preform for the final molding step, is removed from the filter membrane. The nylon fibers in the preform are thoroughly dispersed amongst the mass of interlocked buna-N fibrids; they are non-clustered and multidirectional in position.

The preform is placed in a matched metal mold of approximately the same shape as the screen on which it was formed. The mold is closed and a hydraulic pressure is applied to consolidate, cure and mold the preform into its final shape. The time/temperature/pressure conditions employed in this molding operation are 10 minutes/340° F./500 p.s.i.

The stovepipe-hat-shaped product has a thickness of 10 mils, height of 4 inches, an inside diameter at the top of one inch and at the bottom of 1.5 inches, and an outside diameter at the rim of 3 inches. Because of its uniformity, toughness, flexibility and dimensional stability, it is useful as a sealing sleeve on an air-hydraulic spring.

*Example 2*

In this example a sealing diaphragm is produced which has the same size and shape as the one produced in Example 1. However, the product of this example is layered with respect to the dimensions of the reinforcing fiber and the amount of fiber present.

A slurry of buna-N fibrids is prepared in the same manner as in Example 1.

A first fiber slurry is prepared by thoroughly dispersing 0.25 part of ¼ inch, 1.5 denier nylon staple fiber in 100 parts of water containing a nonionic wetting agent. A second fiber slurry is prepared in a like manner using ½ inch, 6 denier nylon staple fiber.

The first fiber slurry is blended with a portion of the buna-N fibrid slurry in such amounts that the weight ratio of fibrids to fibers in this first blended slurry is 95 to 5.

The second fiber slurry is blended with another portion of the buna-N fibrid slurry in such amounts that the weight ratio of fibrids to fibers in this second blended slurry is 30 to 70.

Employing the filtering apparatus described in Example 1, enough of the first blended slurry is filtered onto the shaped screen to deposit a uniform 5 gram layer (dry basis) of the mixed fibrids and fibers. To protect the wet layer during the next step, it is covered with a plastic tumbler.

Next, enough of the second blended slurry is poured into the reservoir to yield a uniform 15 gram dry layer of the fibrids and fibers therein. The plastic tumble is removed and the slurry quickly filtered, resulting in a two-layered composite shaped waterleaf. Then a uniform 5 gram third layer is deposited over the second layer by again covering the waterleaf with the plastic tumbler, introducing the first blended slurry intto the reservoir, removing the tumbler and quickly filtering.

The resulting three-layered composite waterleaf is dried, removed from the screen and molded under conditions sufficient to consolidate and cure it as was done in Example 1. The dry waterleaf weighed 25 grams and contained 11.0 grams of fiber and 14.0 grams of buna–N.

The consolidated product is a tough unitary structure. Both the inner and outer surfaces are flexible, resilient and smooth. Each surface consists of a layer of cured rubber reinforced with ¼ inch 1.5 denier fibers in the proportion of 95% rubber and 5% fiber. The interior of the structure consists of a layer of cured rubber reinforced with ½ inch, 6 denier fibers in the proportion of 30% rubber and 70% fiber. This layer renders the product highly resistant to tensile and tearing stresses. In all three layers the fibers are in a state of thorough dispersion in the rubber matrix and randomly oriented with respect to each other.

*Example 3*

A sealing diaphragm having the same size and shape as the one produced in Example 1 is produced in this example. The product of this example, however, is layered with respect to the type of rubber present in the structure.

A buna-N fibrid slurry and a nylon fiber slurry are prepared in the same manner as described in Example 1. Also, a slurry is prepared containing fibrid-like waterleaf-forming particles of natural rubber. These particles are made as follows:

Into a 5-quart Waring Blendor operating at high speed and containing a mixture of 600 parts of ice and 600 parts of water containing 2.2 parts of "Philblack" A carbon black is poured as a fine stream 250 parts of a 10% typical rubber skim stock solution in tetrahydrofuran. The rubber stock consists of 100 parts of smoked sheet, 1 part of "Neozone A" phenyl alpha naphthylamine (rubber antioxidant), 1 part of stearic acid, 25 parts of "Philblack" A carbon black, 15 parts zinc oxide, 1 part of "MBTS" benzothiazyl disulfide (rubber accelerator) and 2.5 parts sulfur.

The resulting waterleaf-forming particles of natural rubber are washed with water in a sheet mold, and dispersed in clean water in the ratio of one part of particles to 10 parts water.

Equal amounts of the buna-N fibrid slurry and the slurry of natural rubber particles are blended together to produce a blended slurry containing equal amounts of the particles of the two different types of rubber.

Enough of the nylon fiber slurry is blended with each of the three different slurries (1-buna-N, 2-natural rubber and 3-blend of the two) of rubber particles produced above to result in a 75 to 25 ratio of rubber particles to fibers in all three slurries.

Using the filtering apparatus described in Example 1, sufficient of the buna-N fibrid/fiber slurry is filtered to deposit a 10 gram layer (dry basis) of the fibrid/fiber mixture on the shaped screen. A plastic tumbler is then placed over the wet layer on the screen to protect it while the next batch of slurry is poured into the reservoir. Next, enough of the slurry containing buna-N fibrids, natural rubber particles and nylon fibers is poured into the reservoir to yield a 5 gram dry layer thereof when filtered. The plastic tumbler covering the first-layer is removed, and the 5 gram layer just mentioned is immediately uniformly deposited over the first layer. Similarly, a third layer is deposited over the second layer by again covering the waterleaf with the plastic tumbler, introducing an amount of the natural rubber particle/nylon fiber slurry which will yield a 10 gram layer after removal of the plastic tumbler and filtering.

The composite three-layered waterleaf thus produced is dried, removed from the screen and molded under conditions sufficient to consolidate and cure it as was done in Examples 1 and 2.

The inner surface of the molded product consists of nylon fiber-reinforced buna-N and the outer surface consists of nylon fiber-reinforced natural rubber.

*Example 4*

In this example is produced a polyester fiber-reinforced neoprene sealing diaphragm in the shape of a truncated cone, the inside of which measures 6 inches in height, 3 inches in diameter at the open bottom and 2 inches in diameter at the closed top.

A quantity of neoprene fibrids is prepared from a 32% solution in tetrahydrofurane of the following milled composition:

| | Parts by weight |
|---|---|
| Neoprene GN | 48.39 |
| Neoprene W | 51.61 |
| Carbon black | 77.97 |
| "Neozone" D | 1.94 |
| Stearic acid | 1.94 |
| Calcium carbonate | 41.29 |
| Magnesium oxide | 4.52 |
| Sulfurized oil ("Neophax" A) | 6.45 |
| Petroleum oil ("Circo" oil) | 7.10 |
| Zinc oxide | 6.96 |
| Mixed di-xylol disulfides (Peptizer RR–10) | 0.48 |
| 2-mercaptoimidazoline (Accelerator NA–22) | 0.30 |
| | 248.95 |

Then 200 parts of the 32% solution is poured slowly as a fine stream into a vigorously agitated precipitant which consists of 2000 parts of water at about 40° F. and 7 parts of fine asbestos dispersed therein. The resulting neoprene fibrids are deposited on a screen, washed with water, and dispersed in water in the ratio of one part of fibrids to 10 parts of water.

Separately, a fiber slurry is prepared by thoroughly dispersing 0.25 part of ½ inch, 3.5 denier spontaneously elongatable (when heated to about 300–375° F.) polyethylene terephthalate fibers in 100 parts of water containing 0.05 part of "Triton" X–100. The fibers are of the type described in Belgian Patent No. 566,145.

Sufficient amounts of the neoprene fibrid slurry and the polyester fiber slurry are blended together to give a blended slurry in which the weight ratio of fibrids to fibers is 80 to 20.

A filtering apparatus is provided as in Example 1, except the filter membrane has substantially the dimensions specified at the beginning of this example for the product being produced. A further exception is that the shaped screen is covered with a piece of nylon parachute fabric made to fit over the screen.

A preform for the final molding operation is made by filtering enough of the fibrid/fiber slurry to deposit a 30 gram layer (dry basis) on the nylon fabric-covered screen. The nylon-supported layer is removed from the screen, placed on a shape-retaining form (shaped like the filter screen), dried in a heat zone, and thereafter stripped from the nylon fabric liner. The resulting shaped-waterleaf preform is molded under heat and pressure (340° F., 500 p.s.i. for 10 minutes) to give a consolidated and cured product of excellent flexibility and toughness. The polyethylene terephthalate fibers elongated about 10–15% during the curing step.

*Example 5*

A product similar to that of Example 4, but having a nylon fabric liner as an integral part of the structure, is produced by repeating that example with the single exception that the nylon fabric liner is left in the preform during the final molding operation. This product has exceptional resistance to tensile and tearing stresses.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:
A method of forming a shaped staple fiber reinforced rubber diaphragm, said diaphragm having a fabric as an integral part thereof, said method comprising:
(a) preparing an aqueous slurry of thoroughly dispersed mixture of staple fibers and waterleaf forming fibrids of a curable synthetic rubber composition, the synthetic rubber component of said rubber composition being a member of the group consisting of neoprene and a copolymer of butadiene and acrylonitrile.
(b) filtering said slurry on a porous fabric covered shaped filter screen having a depth at least one half its width to form a shaped waterleaf on said fabric so that the fabric is an integral part of the finished diaphragm,
(c) drying the shaped waterleaf,
(d) heating and pressing the shaped waterleaf in a mold having a depth at least about one half its width until said fibrids are converted into a continuous cured matrix for said fibers, and
(e) removing said diaphragm from said mold.

References Cited in the file of this patent
UNITED STATES PATENTS

| | | |
|---|---|---|
| 1,675,244 | Blombery | June 26, 1928 |
| 1,844,434 | McIntyre | Feb. 9, 1932 |
| 2,006,626 | Blum | July 2, 1935 |
| 2,116,198 | Hawley | May 3, 1938 |
| 2,159,638 | Schur | May 23, 1939 |
| 2,526,125 | Francis | Oct. 17, 1950 |
| 2,810,646 | Wooding et al. | Oct. 22, 1957 |
| 2,930,106 | Wrotnowski | Mar. 29, 1960 |
| 2,986,490 | Randall et al. | May 30, 1961 |

FOREIGN PATENTS

| | | |
|---|---|---|
| 572,962 | Great Britain | Oct. 31, 1945 |
| 674,577 | Great Britain | June 25, 1952 |